US011794160B2

(12) United States Patent
Yang et al.

(10) Patent No.: US 11,794,160 B2
(45) Date of Patent: Oct. 24, 2023

(54) APPARATUS AND METHOD OF PRODUCING INORGANIC POWDER

(71) Applicant: KOREA INSTITUTE OF INDUSTRIAL TECHNOLOGY, Cheonan (KR)

(72) Inventors: Seung Min Yang, Gangneung (KR); Kyung Hoon Kim, Daejeon (KR); Gun Hee Kim, Incheon (KR); Young Kyu Jeong, Hwaseong (KR); O Hyung Kwon, Gangneung (KR); Chan Bin Mo, Wonju (KR); Yong Su Jo, Jecheon (KR); Hye Min Park, Seoul (KR); Gwang Hwa Jin, Wonju (KR)

(73) Assignee: KOREA INSTITUTE OF INDUSTRIAL TECHNOLOGY, Cheonan (KR)

( * ) Notice: Subject to any disclaimer, the term of this patent is extended or adjusted under 35 U.S.C. 154(b) by 0 days.

(21) Appl. No.: 17/544,515

(22) Filed: Dec. 7, 2021

(65) Prior Publication Data

US 2023/0144295 A1    May 11, 2023

(30) Foreign Application Priority Data

Nov. 10, 2021 (KR) .......................... 10-2021-0154264
Nov. 10, 2021 (KR) .......................... 10-2021-0154265

(51) Int. Cl.
  *B01J 19/24* (2006.01)
  *B01J 12/02* (2006.01)
  (Continued)

(52) U.S. Cl.
  CPC ............. *B01J 12/02* (2013.01); *B01J 12/005* (2013.01); *B01J 19/24* (2013.01); *B22F 9/16* (2013.01)

(58) Field of Classification Search
  CPC .......... B01J 12/02; B01J 12/005; B01J 19/24; B22F 9/16; B22F 3/003; B22F 9/12
  (Continued)

(56) References Cited

U.S. PATENT DOCUMENTS 6,679,937 B1    1/2004    Kodas
7,066,980 B2    6/2006    Akimoto
(Continued)

FOREIGN PATENT DOCUMENTS

EP    2 150 971 B1    11/2018
JP    2007-63607 A     3/2007
(Continued)

*Primary Examiner* — Huy Tram Nguyen

(57) ABSTRACT

Provided are an apparatus for producing inorganic powder, and a method of producing inorganic powder by using such. The apparatus includes a vaporization part where a condensed-phase precursor is vaporized to obtain a gas-phase precursor, a partial precipitation part where the gas-phase precursor obtained in the vaporization part is partially precipitated to a condensed phase, and a reaction part where the gas-phase precursor remaining after being partially precipitated to a condensed phase in the partial precipitation part reacts with a reaction gas to obtain inorganic powder. An equilibrium vapor pressure of the gas-phase precursor in the partial precipitation part is lower than a vapor pressure of the gas-phase precursor obtained in the vaporization part, and an equilibrium vapor pressure of the precursor in the reaction part is equal to or higher than a vapor pressure of the gas-phase precursor partially precipitated to a condensed phase in the partial precipitation part.

14 Claims, 16 Drawing Sheets

(51) Int. Cl.
*B01J 12/00* (2006.01)
*B22F 9/16* (2006.01)
(58) Field of Classification Search
USPC .......................................... 422/129
See application file for complete search history.

(56) References Cited

U.S. PATENT DOCUMENTS

| | | |
|---|---|---|
| 9,719,727 B2 | 8/2017 | Layman |
| 2016/0001281 A1* | 1/2016 | Kim .................. B01J 12/02 422/187 |

FOREIGN PATENT DOCUMENTS

| | | | |
|---|---|---|---|
| JP | 2007154222 A | * | 6/2007 |
| JP | 2007154222 A | | 6/2007 |
| TW | I284576 B | | 8/2007 |

* cited by examiner

US 11,794,160 B2

APPARATUS AND METHOD OF PRODUCING INORGANIC POWDER

CROSS-REFERENCE TO RELATED PATENT APPLICATIONS

This application claims the benefit of Korean Patent Application No. 10-2021-0154264, filed on Nov. 10, 2021, and Korean Patent Application No. 10-2021-0154265, filed on Nov. 10, 2021, respectively, in the Korean Intellectual Property Office, the disclosures of which are incorporated herein in their entireties by reference.

BACKGROUND

1. Field

An embodiment of the present disclosure relates to an apparatus for producing inorganic powder, and a method of producing inorganic powder by using the apparatus and, more particularly, to a chemical vapor synthesis apparatus for producing inorganic powder by using chemical reaction between a gas-phase precursor and a reaction gas, and a method of producing inorganic powder by using the chemical vapor synthesis apparatus.

2. Description of the Related Art

A chemical vapor synthesis process is a process for producing a solid-phase material through chemical reaction between a gas-phase precursor and a reaction gas. The solid-phase material includes an inorganic material such as metal or ceramic. Powder of the inorganic material (hereinafter referred to as inorganic powder) may be produced using the chemical vapor synthesis process. A precursor in a gas phase at room temperature may be directly used, or a precursor in a solid or liquid phase at room temperature may also be used by vaporizing the same.

A liquid-phase precursor may be supplied using a pump, a sprayer, a bubbler, or the like. Using a pump, large-volume droplets need to be vaporized in a reactor but a long time is taken for vaporization due to a small specific surface area and poor heat transfer characteristics of the droplets. Using a sprayer, small droplets are produced but still have a small specific surface area, a large amount of gas is used to spray, and a reactor diameter is restricted due to a spray angle. Using a bubbler, although the precursor is easily injected at a constant amount compared to the pump or sprayer, a vaporized amount changes depending on a remaining solution amount, a gas flow rate, or the like.

A solid-phase precursor may be supplied by loading and vaporizing powder or pellets using a feeder or by loading and vaporizing a raw material in a furnace. When powder is loaded using a feeder, an error occurs in the feeder depending on characteristics of the powder, e.g., flowability or moisture content, and thus quantitative injection may not be easily achieved. When pellets are loaded using a feeder, a specific surface area changes as the pellets are vaporized, and thus a vaporized amount is not constant. Similarly, when a raw material is loaded in a furnace, a specific surface area changes as the raw material is vaporized, and thus a vaporized amount is not constant.

As described above, a precursor in a solid or liquid phase at room temperature may not be easily supplied at a constant amount and, when powder is produced using a chemical vapor synthesis process, the powder exhibits a wide particle size distribution due to the change in amount of the supplied precursor. Therefore, a method of quantitatively supplying a solid- or liquid-phase precursor in a chemical vapor synthesis process is required.

SUMMARY

An embodiment of the present disclosure provides a chemical vapor synthesis apparatus including a precursor supplier capable of quantitatively supplying a gas-phase precursor obtained by vaporizing a solid- or liquid-phase precursor, to a reaction part at a constant amount. An embodiment of the present disclosure also provides a method of producing inorganic powder having a uniform particle shape and a narrow particle size distribution, by using the chemical vapor synthesis apparatus.

However, the scope of embodiments of the present disclosure are not limited thereto.

According to an embodiment of the present disclosure, there is provided an apparatus for producing inorganic powder, the apparatus including a vaporization part where a condensed-phase precursor is vaporized to obtain a gas-phase precursor, a partial precipitation part where the gas-phase precursor obtained in the vaporization part is partially precipitated to a condensed phase, and a reaction part where the gas-phase precursor remaining after being partially precipitated to a condensed phase in the partial precipitation part reacts with a reaction gas to obtain inorganic powder.

An equilibrium vapor pressure of the gas-phase precursor in the partial precipitation part may be lower than a vapor pressure of the gas-phase precursor obtained in the vaporization part, and an equilibrium vapor pressure of the precursor in the reaction part may be equal to or higher than a vapor pressure of the gas-phase precursor partially precipitated to a condensed phase in the partial precipitation part.

A temperature of the vaporization part may be higher than a temperature of the partial precipitation part, and a temperature of the reaction part may be equal to or higher than the temperature of the partial precipitation part.

The partial precipitation part may include a precipitation induction member for inducing precipitation of the gas-phase precursor.

The apparatus may include a bottom-up type in which the vaporization part, the partial precipitation part, and the reaction part are sequentially provided in a direction opposite to a direction of gravity, a top-down type in which the vaporization part, the partial precipitation part, and the reaction part are sequentially provided in the direction of gravity, and a horizontal type in which the vaporization part, the partial precipitation part, and the reaction part are sequentially provided in a direction perpendicular to the direction of gravity.

The inorganic powder may include metal powder or ceramic powder.

The precursor may include at least one of metal acetate, metal bromide, metal carbonate, metal chloride, metal fluoride, metal hydroxide, metal iodide, metal nitrate, metal oxide, metal phosphate, metal silicate, metal sulfate, and metal sulfide.

The inorganic powder may include nickel (Ni), copper (Cu), silver (Ag), iron (Fe), aluminum (Al), cobalt (Co), platinum (Pt), gold (Au), tin (Sn), or an alloy thereof.

The inorganic powder may include an oxide, nitride, or carbide of Ni, Cu, Ag, Fe, Al, Co, Pt, Au, or Sn.

According to an embodiment of the present disclosure, there is provided an apparatus for producing inorganic powder, the apparatus including a precursor supplier including a channel, and a reaction part where a gas-phase precursor supplied from the precursor supplier reacts with a reaction gas to obtain inorganic powder.

The precursor supplier may include a vaporization part where a condensed-phase precursor is vaporized to obtain the gas-phase precursor, and a partial precipitation part where the gas-phase precursor obtained in the vaporization part is partially precipitated to a condensed phase.

The channel of the precursor supplier may be configured in such a manner that a fluid passes sequentially through the vaporization part and the partial precipitation part and then is discharged to the reaction part, and the gas-phase precursor remaining after being partially precipitated to a condensed phase in the partial precipitation part may be injected into the reaction part.

An equilibrium vapor pressure of the precursor in the partial precipitation part may be lower than a vapor pressure of the gas-phase precursor obtained in the vaporization part, and an equilibrium vapor pressure of the precursor in the reaction part may be equal to or higher than a vapor pressure of the gas-phase precursor partially precipitated to a condensed phase in the partial precipitation part.

The channel may be configured to include at least one downward channel through which a fluid flows downward, and at least one upward channel through which the fluid flows upward, and the downward and upward channels may be provided adjacent to each other in parallel.

A temperature of the vaporization part may be maintained higher than a temperature of the partial precipitation part, and a temperature of the reaction part may be maintained equal to or higher than the temperature of the partial precipitation part.

The apparatus may further include a quenching gas inlet for injecting a quenching gas into the partial precipitation part.

An end of the channel of the precursor supplier, where a fluid is discharged to the reaction part, may be increased in cross-sectional area along a direction in which the fluid moves.

The vaporization part may be included in the downward channel heated by a heat source, and the partial precipitation part may be provided between the upward channel extending from the downward channel including the vaporization part, and the downward channel extending to the reaction part.

The vaporization part may include a precursor vaporizer provided in a region through which a fluid moving downward along the downward channel heated by a heat source passes, and the partial precipitation part may be provided between the upward channel extending from the downward channel including the precursor vaporizer, and the downward channel extending to the reaction part.

The vaporization part may include a precursor vaporizer provided in a region through which a fluid moving upward along the upward channel heated by a heat source passes, and the partial precipitation part may be provided between the downward channel extending from the upward channel including the precursor vaporizer, and the upward channel extending to the reaction part.

BRIEF DESCRIPTION OF THE DRAWINGS

The above and other features and advantages of embodiments of the present disclosure will become more apparent by describing in detail embodiments thereof with reference to the attached drawings in which.

DETAILED DESCRIPTION

Figure 1:
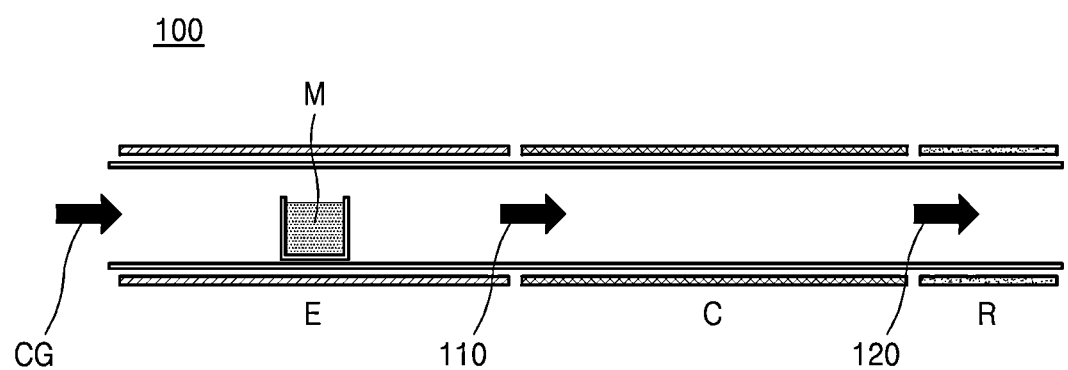
FIG. 1 is a conceptual view of a chemical vapor synthesis apparatus for describing the concept of a partial precipitation part according to an embodiment of the present disclosure.

Hereinafter, various embodiments of the present disclosure will be described in detail with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. Like reference numerals denote like elements throughout. Various elements and regions are schematically illustrated in the drawings. Therefore, the scope of embodiments of the present disclosure is not limited by the sizes or distances shown in the attached drawings.

According to an embodiment of the present disclosure, a gas-phase precursor may be obtained by vaporizing a solid- or liquid-phase precursor, and the solid or liquid phase is defined as a condensed phase in distinction to the gas phase.

An embodiment of the present disclosure provides an apparatus and method of quantitatively supplying a gas-phase precursor at a constant amount to achieve a uniform particle shape and a narrow particle size distribution of inorganic powder produced through chemical vapor synthesis using reaction between the gas-phase precursor and a reaction gas. To this end, a configuration for partially precipitating the gas-phase precursor obtained by vaporizing a condensed-phase precursor, to a condensed phase before reacting with the reaction gas is provided. Then, the gas-phase precursor, which has reached a saturated vapor pressure through partial precipitation, is injected into a reaction part and reacts with the reaction gas to obtain the inorganic powder.

When the gas-phase precursor has reached the saturated vapor pressure at a specific temperature, it means that the gas-phase precursor vaporized to exceed the saturated vapor pressure has been entirely precipitated to a condensed phase. Because the saturated vapor pressure at the specific temperature is determined as a constant value, when the saturated vapor pressure is maintained at the specific temperature, it means that the gas-phase precursor is also maintained at a constant amount. Even when the precursor is vaporized to exceed the saturated vapor pressure, once a condition of the saturated vapor pressure is satisfied, an amount of the precursor exceeding the saturated vapor pressure is entirely precipitated to a condensed phase. In an embodiment of the present disclosure, the configuration for partially precipitating the gas-phase precursor to have the saturated vapor pressure is referred to as a partial precipitation part. The partial precipitation part includes a region or space through which a fluid may pass. The partial precipitation part may further include a precipitation induction member for inducing partial precipitation in the region or space.

In an embodiment of the present disclosure, a precursor corresponding to a raw material of inorganic powder is a condensed-phase metal compound which reacts with a reaction gas to obtain inorganic powder. The precursor may include one or more of metal acetate, metal bromide, metal carbonate, metal chloride, metal fluoride, metal hydroxide, metal iodide, metal nitrate, metal oxide, metal phosphate, metal silicate, metal sulfate, and metal sulfide, but is not limited thereto.

The inorganic powder may include nickel (Ni), copper (Cu), silver (Ag), iron (Fe), aluminum (Al), cobalt (Co), platinum (Pt), gold (Au), tin (Sn), or an alloy thereof.

The inorganic powder may include an oxide, nitride, or carbide of Ni, Cu, Ag, Fe, Al, Co, Pt, Au, or Sn.

FIG. 1 is a conceptual view of a chemical vapor synthesis apparatus 100 for describing the concept of a partial precipitation part according to an embodiment of the present disclosure. Referring to FIG. 1, the chemical vapor synthesis apparatus 100 includes a vaporization part E, a partial precipitation part C, and a reaction part R.

The vaporization part E provides a region where a condensed-phase precursor is vaporized to obtain a gas-phase precursor. For example, as shown in FIG. 1, a precursor vaporizer M for heating and vaporizing the precursor by using a heat source may be provided in the vaporization part E. The precursor vaporizer M may have a form of a furnace loaded with a powder- or pellet-type precursor or a liquid-phase precursor. In this case, a carrier gas CG injected into the vaporization part E is mixed with the gas-phase precursor vaporized by the precursor vaporizer M. A mixed gas of the carrier gas CG and the gas-phase precursor moves into the partial precipitation part C. An arrow 110 of FIG. 1 represents that the mixed gas of the carrier gas CG and the gas-phase precursor is provided to the partial precipitation part C.

As another example, the vaporization part E may be heated by the heat source to a temperature equal to or higher than a precursor vaporization temperature. A powder-type precursor may be injected into the heated vaporization part E together with the carrier gas CG and be vaporized to a gas phase to obtain a gas-phase precursor.

The partial precipitation part C provides a region where the gas-phase precursor obtained in the vaporization part E is partially precipitated to a condensed phase. In this case, the precursor precipitated in the partial precipitation part C corresponds to an amount exceeding a precursor vaporization amount corresponding to an equilibrium vapor pressure at a corresponding temperature. The precursor precipitated to a condensed phase may fall to the bottom of the partial precipitation part C due to a self-weight or be condensed on the surface of a member provided on a path of the gas-phase precursor. An arrow 120 of FIG. 1 represents that the mixed gas of the carrier gas CG and the gas-phase precursor remaining after being partially precipitated to a condensed phase in the partial precipitation part C is injected into the reaction part R.

The reaction part R provides a region where the gas-phase precursor remaining after being partially precipitated to a condensed phase in the partial precipitation part C reacts with a reaction gas to obtain inorganic powder. Although not shown in FIG. 1, the reaction part R includes a configuration through which the reaction gas is injected. Because the gas-phase precursor is already partially precipitated in the partial precipitation part C and is always injected into the reaction part R in a saturated state, the gas-phase precursor supplied to the reaction part R is maintained at a constant amount. As an effect of quantitatively supplying the precursor, the inorganic powder obtained in the reaction part R has a uniform particle shape and has a uniform particle diameter to exhibit a narrow particle size distribution. Therefore, an existing problem such as a non-uniform particle diameter or a wide particle size distribution of powder caused by irregular supply of a gas-phase precursor may be solved.

Embodiments of the present disclosure may be implemented by satisfying Conditions 1 and 2.

Condition 1: An equilibrium vapor pressure $P_C^{eq}$ of a gas-phase precursor in a partial precipitation part is lower than a vapor pressure $P_E$ of the gas-phase precursor obtained in a vaporization part.

Condition 2: An equilibrium vapor pressure $P_R^{eq}$ of the precursor in a reaction part is equal to or higher than a vapor pressure $P_C$ of the gas-phase precursor that remains after being partially precipitated to a condensed phase in the partial precipitation part.

When Condition 1 is satisfied, the precursor is precipitated by an amount corresponding to a difference between $P_C^{eq}$ and $P_E$.

Although Condition 1 is satisfied and the partially precipitated gas-phase precursor is injected into the reaction part, when the vapor pressure $P_C$ of the gas-phase precursor injected into the reaction part is still higher than the equilibrium vapor pressure $P_R^{eq}$ of the reaction part, the gas-phase precursor would also be partially precipitated to a condensed phase in the reaction part as in the partial precipitation part. Such precipitation in the reaction part causes impurities other than inorganic powder normally obtained by reaction with a reaction gas and thus greatly deteriorates the quality of the inorganic powder.

Therefore, $P_R^{eq}$ needs to be at least equal to or higher than $P_C$ in the reaction part. The above condition should be satisfied to prevent undesired precipitation of the gas-phase precursor to a condensed phase other than reaction with the reaction gas in the reaction part.

On the other hand, when $P_C$ is lower than $P_R^{eq}$, the gas-phase precursor injected into the reaction part is not precipitated before contacting the reaction gas, and participates in reaction after contacting the reaction gas.

A temperature in each part when a gas flowing from the vaporization part through the partial precipitation part to the reaction part is maintained at a constant flow rate will now be described. To satisfy Condition 1, the vaporization part E illustrated in FIG. 1 has a temperature T1 equal to or higher than a precursor vaporization temperature, and the partial precipitation part C has a temperature T2 lower than the temperature T1 of the vaporization part E. A temperature difference between T1 and T2 serves as a thermodynamic driving force by which the gas-phase precursor is partially precipitated to a condensed phase. To satisfy Condition 2, a temperature T3 of the reaction part R is equal to or higher than the temperature T2 in the partial precipitation part C. Therefore, a thermodynamic driving force by which the gas-phase precursor injected into the reaction part R is partially precipitated to a condensed phase is not present and thus precipitation to a condensed phase does not occur.

To verify an embodiment of the present disclosure, behaviors of a gas-phase precursor based on temperature in a vaporization part, a partial precipitation part, and a reaction part were simulated using the chemical vapor synthesis apparatus 100 illustrated in FIG. 1.

The precursor used for the simulation was solid-phase $NiCl_2$ for producing nickel (Ni) powder and, considering an equilibrium vapor pressure of $NiCl_2$ based on temperature, $NiCl_2$ was injected into a vaporization part maintained at a temperature equal to or higher than a vaporization temperature and then was vaporized. A carrier gas was used as nitrogen ($N_2$), and reaction was not considered to observe only vapor pressure changes of the precursor. The carrier gas was fixed at 15 liters per minute (LPM) for Comparative Example A and at 30 LPM for the others. A vapor pressure of vaporized $NiCl_2$ was calculated by multiplying a total pressure in the chemical vapor synthesis apparatus by a fraction occupied by gas-phase $NiCl_2$ in a mixed gas of gas-phase $NiCl_2$ and the carrier gas. Therefore, when the flow rate of the injected carrier gas is constant, the vapor pressure of $NiCl_2$ is determined based on temperature.

Table 1 shows process conditions used for the simulation, and FIGS. 2A to 4B show a vapor pressure P1 of the precursor in the vaporization part, a vapor pressure P2 of the precursor after partial precipitation, and an equilibrium vapor pressure P3 of the precursor in the reaction part, based on an injection rate V of the precursor under each process condition.

equal to that of the partial precipitation part, even when the partially precipitated gas-phase precursor is injected into the reaction part, no more precipitation occurs due to absence of a thermodynamic driving force.

Figure 2A:
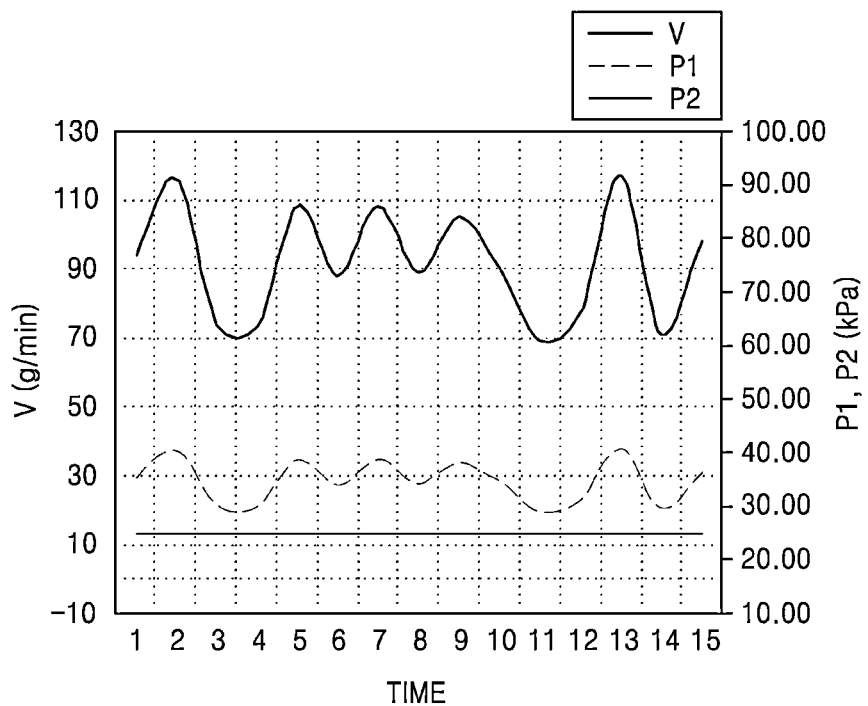
FIGS. 2A to 4B show a vapor pressure of a precursor in a vaporization part and a vapor pressure of the precursor after partial precipitation, based on an injection rate of the precursor under each condition.

Referring to FIG. 2A, the injection rate V of the precursor injected into the vaporization part refers to a weight of $NiCl_2$ injected per hour, and the vapor pressure P1 of $NiCl_2$ in the vaporization part exhibits an increase or decrease in response to the increase or decrease in weight of injected $NiCl_2$. However, it is shown that gas-phase $NiCl_2$ exceeding the equilibrium vapor pressure of $NiCl_2$ is precipitated to a solid phase in the partial precipitation part and thus the vapor pressure of $NiCl_2$ is constantly maintained at the equilibrium vapor pressure P2 after partial precipitation regardless of the injection amount of $NiCl_2$. This means that, even when the amount of $NiCl_2$ injected into the vaporization part of a reactor is irregular, the vapor pressure of vaporized $NiCl_2$ is always constantly maintained in the reaction part.

Figure 2B:
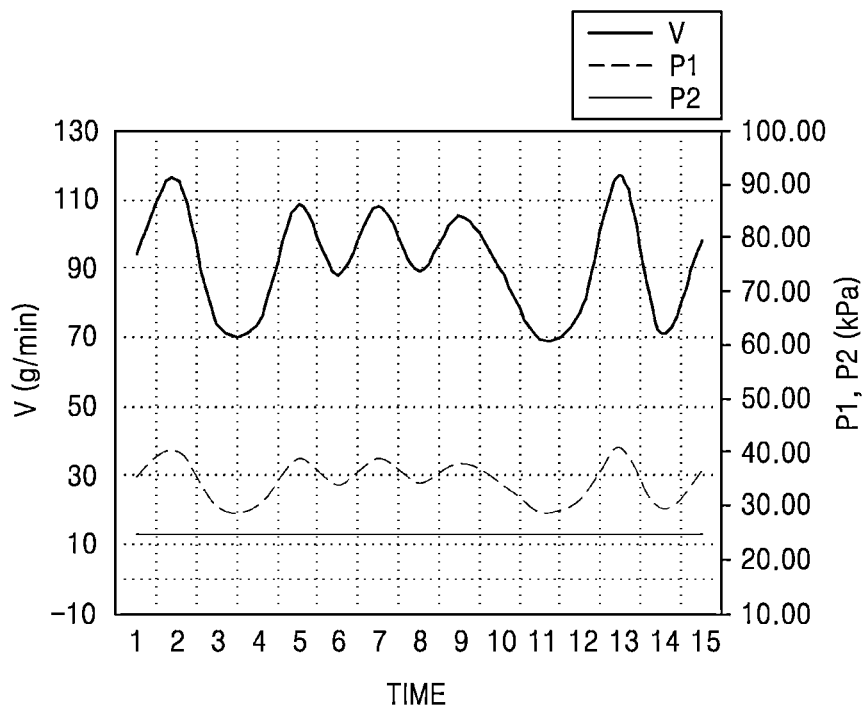

FIG. 2B shows a result of Embodiment B under the same process conditions as Embodiment A except that the temperature of the reaction part is 1000° C. When the temperature of the reaction part is 1000° C., the simulation result is the same as Embodiment A in that no more precipitation occurs in the reaction part.

Figure 3A:
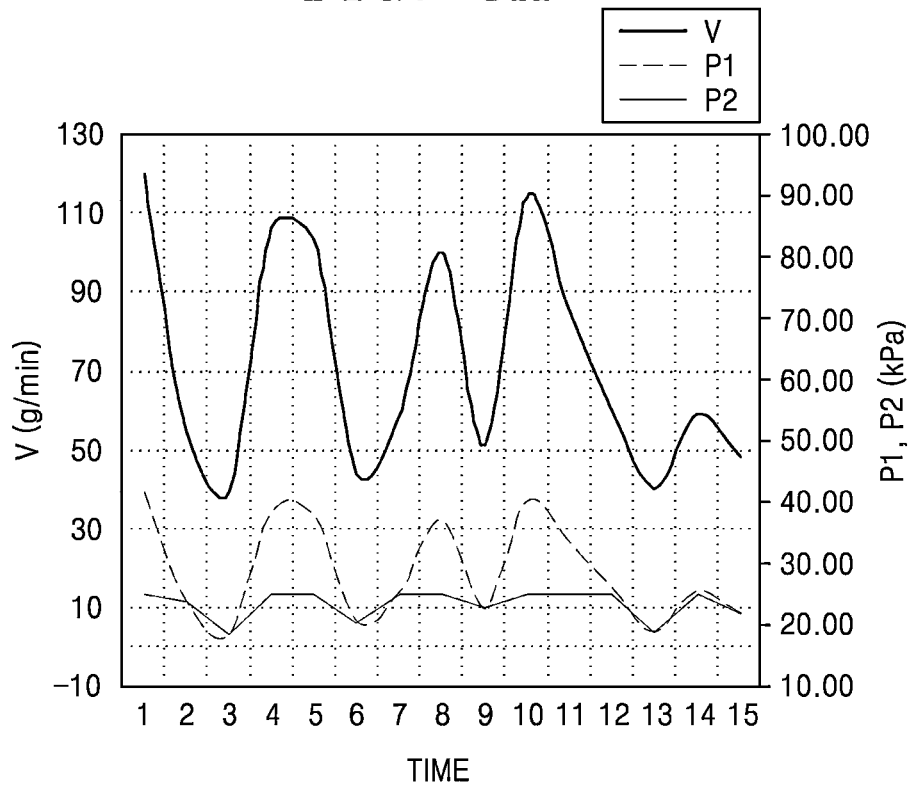
Figure 3B:
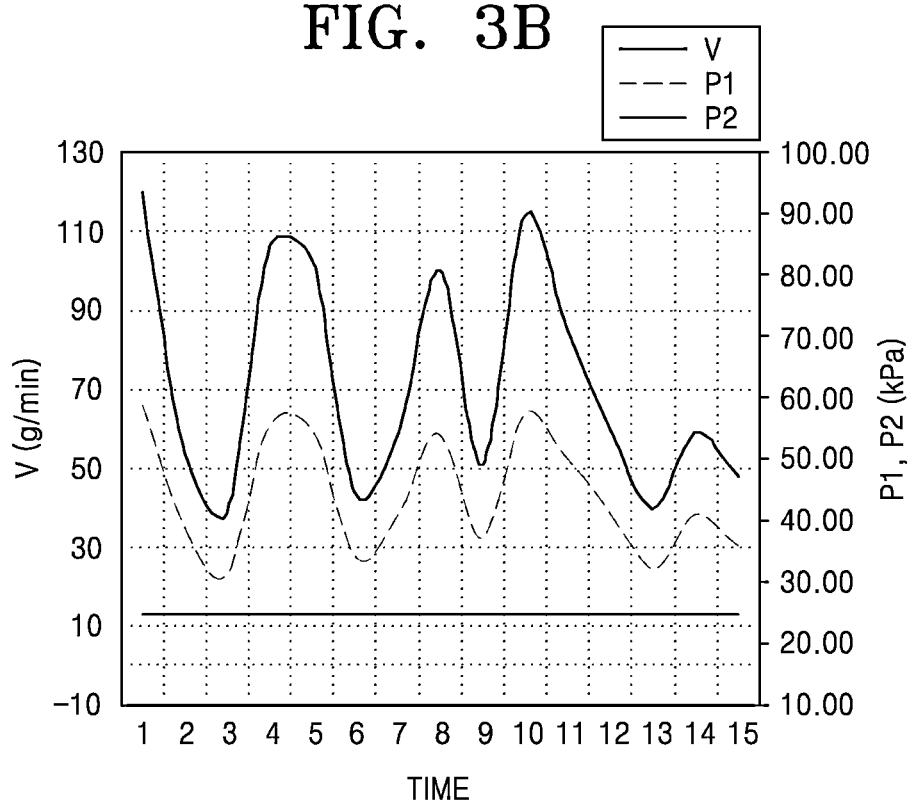

FIGS. 3A and 3B show simulation results of Comparative Example A and Embodiment C. Referring to FIG. 3A, in Comparative Example A, the injection rate V of $NiCl_2$ injected into the vaporization part has a large deviation, and this means that injected $NiCl_2$ greatly changes in weight over time. When the injection rate V of the precursor has the

TABLE 1

|  | Condition 1 | Condition 2 | Carrier Gas Flow Rate (LPM) | Vaporization Part Temp. (° C.) | Partial Precipitation Part Temp. (° C.) | Reaction Part Temp. (° C.) |
| --- | --- | --- | --- | --- | --- | --- |
| Embodiment A | ○ | ○ | 30 | 950 | 900 | 900 |
| Embodiment B | ○ | ○ | 30 | 950 | 900 | 1000 |
| Embodiment C | ○ | ○ | 15 | 950 | 900 | 950 |
| Comparative Example A | X | ○ | 30 | 950 | 900 | 950 |
| Comparative Example B | X | ○ | 30 | 900 | 950 | 950 |
| Comparative Example C | ○ | X | 30 | 950 | 900 | 850 |

FIGS. 2A and 2B show simulation results of Embodiments A and B, and show a vapor pressure P1 (kPa) of the precursor in the vaporization part and a vapor pressure P2 (kPa) of the precursor after partial precipitation, based on an injection rate V (g/min) of the precursor over time.

Referring to Table 1, Embodiments A and B both satisfy Conditions 1 and 2. That is, when a flow rate of the carrier gas injected into the chemical vapor synthesis apparatus is maintained at 30 LPM, a temperature of the vaporization part is maintained higher than the temperature of the partial precipitation part, and temperatures of the partial precipitation part and the reaction part are maintained the same. Equilibrium vapor pressures of $NiCl_2$ at 850° C., 900° C., and 950° C. are 9.78 kPa, 24.97 kPa, and 58.46 kPa. Therefore, the maximum vapor pressure of $NiCl_2$ sufficiently vaporized in the vaporization part maintained at 950° C. is 58.46 kPa and, when $NiCl_2$ is provided to the partial precipitation part maintained at 900° C., precipitation occurs by an amount exceeding the equilibrium vapor pressure of the partial precipitation part, i.e., 24.97 kPa. In Embodiment A, because the temperature of the reaction part is 900° C.

lowest value, the vapor pressure P1 in the vaporization part is lower than the equilibrium vapor pressure in the partial precipitation part. In this state, when $NiCl_2$ is injected into the vaporization part, vaporized, and then provided into the partial precipitation part, because the vapor pressure P1 of gas-phase $NiCl_2$ in the vaporization part which is lower than the equilibrium vapor pressure in the partial precipitation part is present, Condition 1 is not satisfied. Therefore, the effect that the vapor pressure P2 of gas-phase $NiCl_2$ becomes constant to a saturated vapor pressure in the partial precipitation part as in Embodiment A does not occur. When gas-phase $NiCl_2$ is injected into the reaction part while the vapor pressure of gas-phase $NiCl_2$ is changing in response to the change in weight of $NiCl_2$ injected into the vaporization part as described above, this means that the amount of gas-phase $NiCl_2$ supplied to the reaction part irregularly changes over time. Ni particles obtained in the reaction part under the above condition have irregular diameters and thus exhibit a wide particle size distribution.

To solve the above problem, the vapor pressure of gas-phase $NiCl_2$ in the vaporization part needs to be increased to be higher than the equilibrium vapor pressure of the partial precipitation part. Embodiment C reduces the injection amount of the carrier gas to 15 LPM compared to Comparative Example A. By halving the injection amount of the carrier gas, a fraction of gas-phase $NiCl_2$ in the mixed gas of the carrier gas and vaporized $NiCl_2$ is relatively increased. As such, the vapor pressure of $NiCl_2$ in the vaporization part is higher than the saturated vapor pressure of gas-phase $NiCl_2$ in the partial precipitation part. Referring to FIG. 3B, it is shown that, when the vapor pressure P1 of the $NiCl_2$ gas in the vaporization part is increased, the vapor pressure P2 of gas-phase $NiCl_2$ in the partial precipitation part becomes constant to the saturated vapor pressure due to precipitation.

Figure 4A:
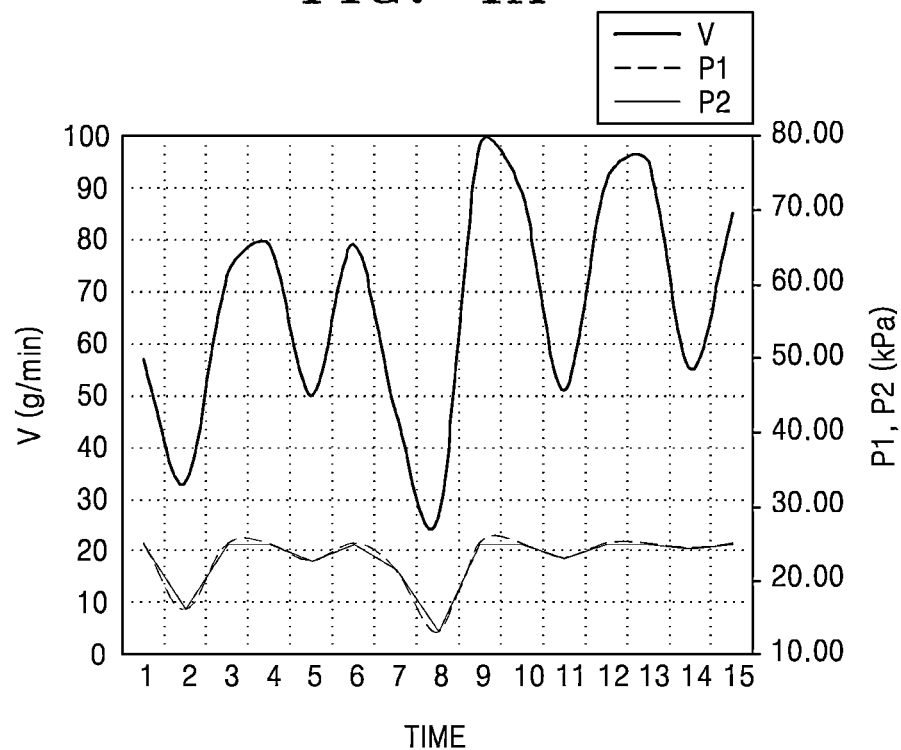
Figure 4B:
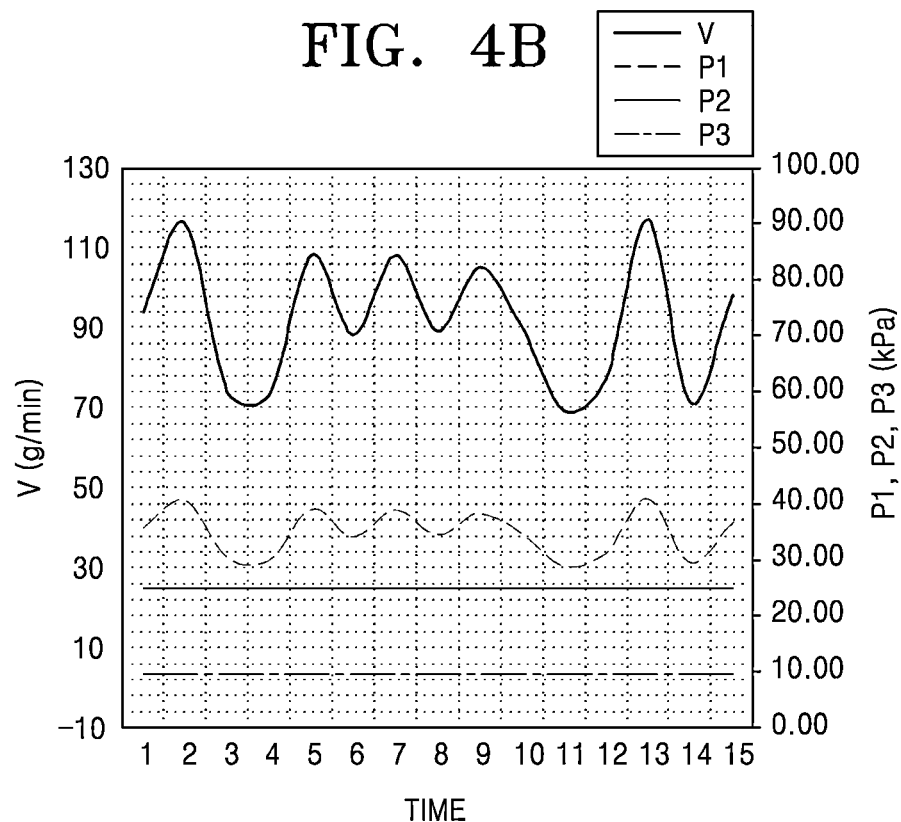

FIGS. 4A and 4B show simulation results of Comparative Examples B and C.

Referring to Table 1, in Comparative Example B, a temperature of the partial precipitation part is maintained higher than the temperature of the vaporization part. Therefore, Condition 1 is not satisfied and thus the effect of partial precipitation caused when the vapor pressure P1 of vaporized $NiCl_2$ in the vaporization part is higher than the equilibrium vapor pressure in the partial precipitation part does not occur. Therefore, the vapor pressure P2 of gas-phase $NiCl_2$ in the partial precipitation part is substantially the same as the vapor pressure P1 in the vaporization part, and the change in vapor pressure of gas-phase $NiCl_2$ in the reaction part over time occurs substantially the same as that in the vaporization part. This means that gas-phase $NiCl_2$ is not quantitatively supplied to the reaction part.

Referring to Table 1, in Comparative Example C, a temperature of the reaction part, i.e., 850° C., is lower than the temperature of the partial precipitation part, i.e., 900° C., and thus Condition 2 is not satisfied. Therefore, referring to FIG. 4B, although gas-phase $NiCl_2$ partially precipitated in the partial precipitation part is injected into the reaction part with a vapor pressure of P2, solid-phase $NiCl_2$ is precipitated by an amount exceeding the equilibrium vapor pressure P3 in the reaction part. When solid-phase $NiCl_2$ is precipitated in the reaction part as described above, produced powder may not be used as a product.

Figure 5A:
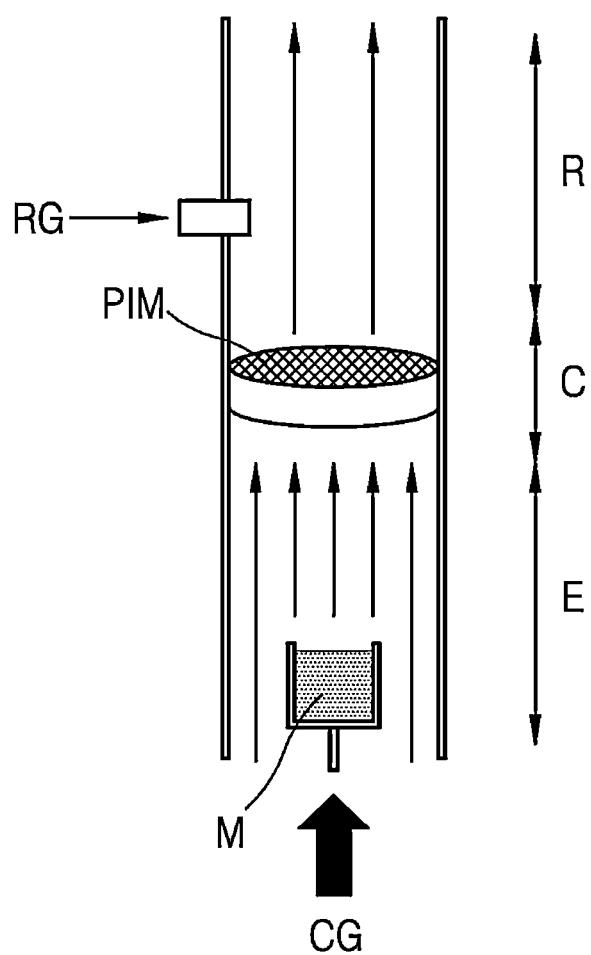
FIGS. 5A to 5C are conceptual views of various types of chemical vapor synthesis apparatuses according to embodiments of the present disclosure.
Figure 5B:
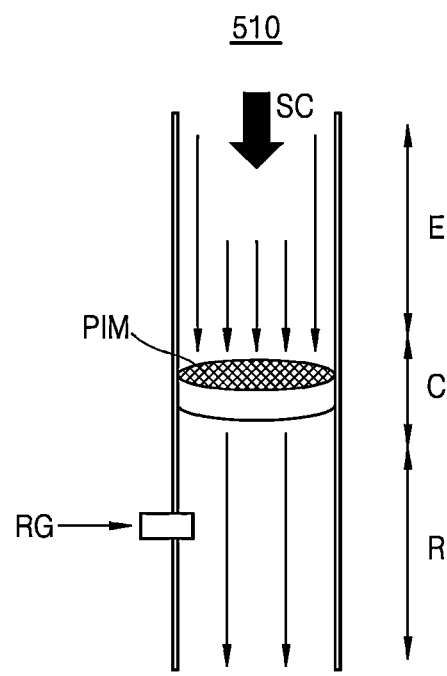
Figure 5C:
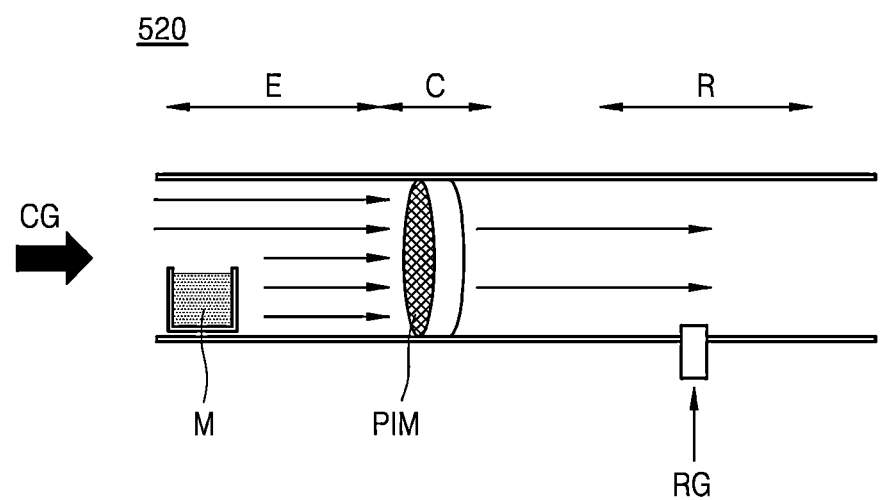

According to an embodiment of the present disclosure, the partial precipitation part is enough as long as the partial precipitation part may be maintained at a specific temperature to satisfy Conditions 1 and 2 and includes a space through which a fluid may move. FIGS. 5A to 5C are conceptual views of various types of chemical vapor synthesis apparatuses according to embodiments of the present disclosure. A bottom-up type 500 in which the vaporization part E, the partial precipitation part C, and the reaction part R are sequentially provided in a direction opposite to the direction of gravity, a top-down type 510 in which the vaporization part E, the partial precipitation part C, and the reaction part R are sequentially provided in the direction of gravity, and a horizontal type 520 in which the vaporization part E, the partial precipitation part C, and the reaction part R are sequentially provided in a direction perpendicular to the direction of gravity are illustrated in FIGS. 5A to 5C, respectively.

Referring to FIGS. 5A and 5C, the bottom-up type 500 and the horizontal type 520 may include the precursor vaporizer M in the vaporization part E. A gas-phase precursor vaporized from the precursor vaporizer M may be mixed with a carrier gas CG injected into the vaporization part E, so as to form a mixed gas. The mixed gas moves to the partial precipitation part C and the reaction part R. Inorganic powder is obtained in the reaction part R by reaction with an additionally injected reaction gas RG.

Referring to FIG. 5B, in the top-down type 510, when injected into the vaporization part E, a powder-type precursor SC carried by a carrier gas may be directly vaporized while falling in the vaporization part E heated to a high temperature. Inorganic powder is obtained in the reaction part R by reaction with an additionally injected reaction gas RG.

FIGS. 5A to 5C are merely examples, and the precursor powder may also be injected into the vaporization part E together with the carrier gas in the bottom-up and horizontal types 500 and 520 whereas the vaporization part E may also include the precursor vaporizer M in the top-down type 510.

In the partial precipitation part C of each type of chemical vapor synthesis apparatus, a precipitation induction member PIM capable of inducing partial precipitation of a gas-phase precursor may be additionally provided. In an embodiment, the precipitation induction member PIM may have one or more openings through which the gas-phase precursor passes. The precipitation induction member PIM may be maintained at a temperature lower than that of the vaporization part E to partially precipitate the gas-phase precursor supplied from the vaporization part E. In addition, a channel through which the gas-phase precursor passes may be provided in such a manner that the gas-phase precursor supplied from the vaporization part E moves to the reaction part R after partial precipitation occurs. A condensed-phase precursor obtained by partial precipitation, e.g., solid-phase particles or droplets, may be adhered to and accumulated on the precipitation induction member PIM.

Figure 6:
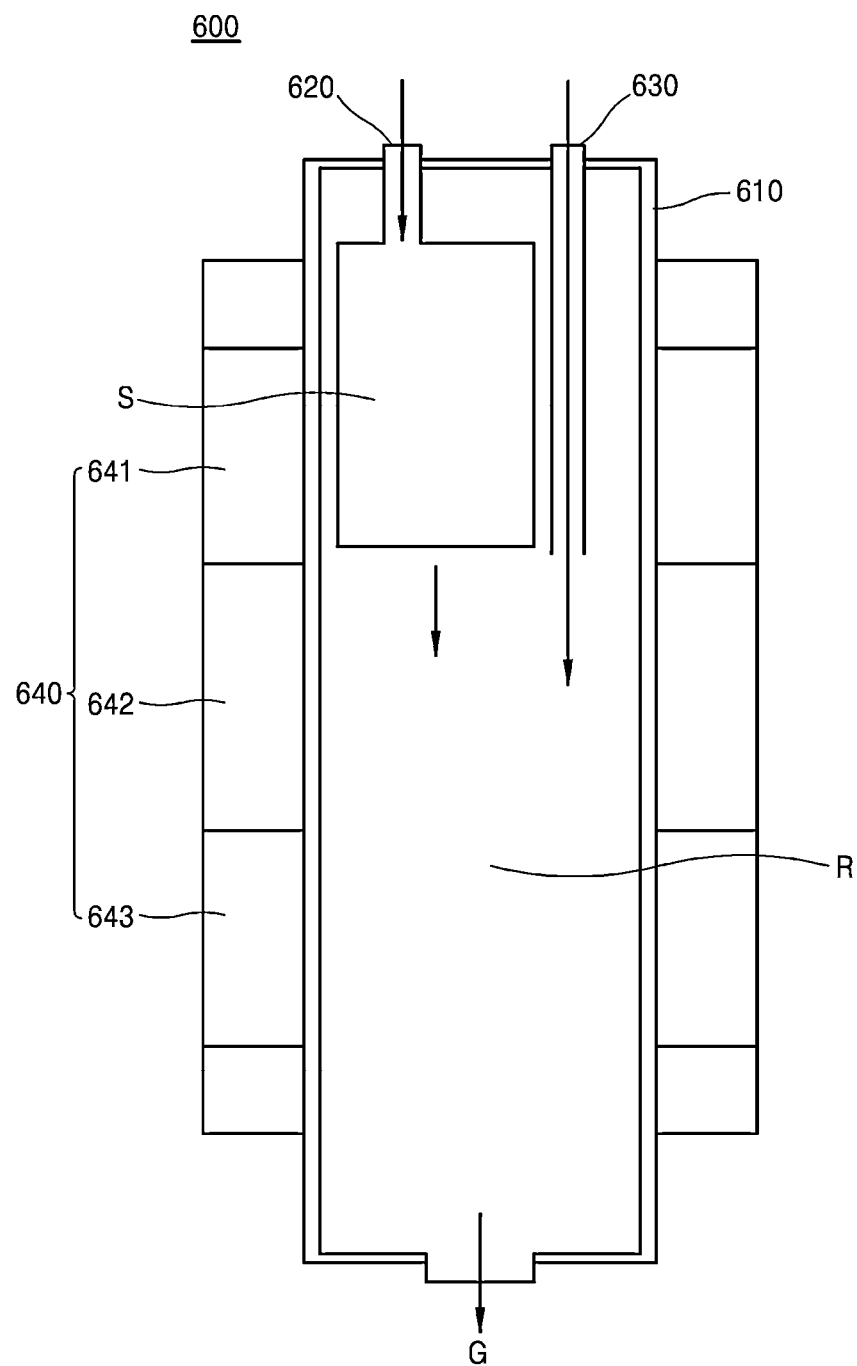
FIG. 6 is a schematic diagram of a top-down chemical vapor synthesis apparatus according to an embodiment of the present disclosure.

FIG. 6 shows a top-down chemical vapor synthesis apparatus 600 including a vertical reaction chamber, as an example of an apparatus for producing inorganic powder, according to an embodiment of the present disclosure.

Referring to FIG. 6, the chemical vapor synthesis apparatus 600 includes a vertical reaction chamber 610 having a cavity extending in a vertical direction. A heater 640 for heating the reaction chamber 610 is provided on an outer circumferential surface of the reaction chamber 610. The heater 640 may include, for example, a resistive heating element heated by electricity. The heater 640 may be divided into a plurality of heaters, temperatures of which are independently controlled. For example, as illustrated in FIG. 6, three heaters such as heater 1 641, heater 2 642, and heater 3 643 may be provided in a downward direction. The three heaters 641, 642, and 643 may be controlled to different temperatures. Therefore, various temperature distributions may be implemented in portions of the reaction chamber 610 by controlling the temperature of each heater. For example, upper and lower portions in a precursor supplier S may be maintained at different temperatures. As another example, the reaction part R may be implemented to be gradually reduced in temperature in a downward direction.

The precursor supplier S for vaporizing a precursor and supplying the vaporized precursor to the reaction part R is provided in an upper portion of the reaction chamber 610, and the reaction part R where a gas-phase precursor reacts with a reaction gas to obtain inorganic powder is provided under the precursor supplier S. The inorganic powder obtained in the reaction part R is collected by a collector G provided under the reaction part R and then is additionally processed, e.g., sorted and cleaned.

A first supplier 620 provided on the reaction chamber 610 supplies a raw material such as the precursor to the precursor supplier S together with a carrier gas. As another example, when the precursor supplier S includes a precursor vaporizer, the first supplier 620 may inject only a carrier gas for carrying a vaporized precursor. Additionally, the first supplier 620 may include a separate channel to further supply a quenching gas for cooing a partial precipitation part in the precursor supplier S. To vaporize the precursor, the precursor supplier S needs to be maintained at a high temperature equal to or higher than a certain temperature. In addition, to partially precipitate the gas-phase precursor, the precursor supplier S may have a local region with a low temperature. To this end, local portions in the precursor supplier S may be maintained at different temperatures by appropriately controlling the temperature of the heater 640 around the precursor supplier S.

A second supplier 630 is a channel through which a reaction gas reacting with the gas-phase precursor injected from the precursor supplier S is injected into the reaction part R, and is not particularly limited to any shape or path as long as it has a configuration for directly supplying the reaction gas to the reaction part R.

The precursor supplier S vaporizes the precursor to obtain a gas-phase precursor, and discharges the gas-phase precursor to the reaction part R. Therefore, a channel through which the gas-phase precursor may flow is provided in the precursor supplier S. The precursor injected through the first supplier 620 may be injected into and vaporized in the precursor supplier S to obtain the gas-phase precursor. As another example, a separate precursor vaporizer may be provided in the precursor supplier S and, in this case, the carrier gas injected through the first supplier 620 is mixed with the precursor vaporized from the precursor vaporizer and the mixed gas is discharged from the precursor supplier S and is injected into the reaction part R.

Various types of precursor suppliers according to embodiments of the present disclosure will now be described.

A precursor supplier according to an embodiment of the present disclosure includes a vaporization part where a condensed-phase precursor is vaporized to obtain a gas-phase precursor, and a partial precipitation part where the gas-phase precursor obtained in the vaporization part is partially precipitated to a condensed phase. In this case, a channel of the precursor supplier is configured in such a manner that a fluid passes sequentially through the vaporization part and the partial precipitation part and then is discharged to a reaction part. An equilibrium vapor pressure of the precursor in the partial precipitation part is lower than a vapor pressure of the gas-phase precursor obtained in the vaporization part, and an equilibrium vapor pressure of the precursor in the reaction part is equal to or higher than a vapor pressure of the gas-phase precursor partially precipitated to a condensed phase in the partial precipitation part.

Figure 7A:
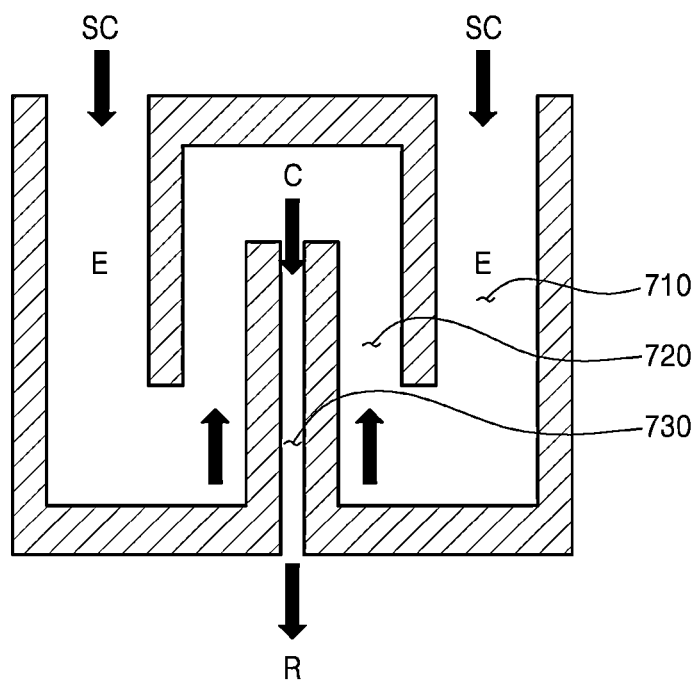
FIGS. 7A to 9C show embodiments of a top-down precursor supplier of the present disclosure.
Figure 7B:
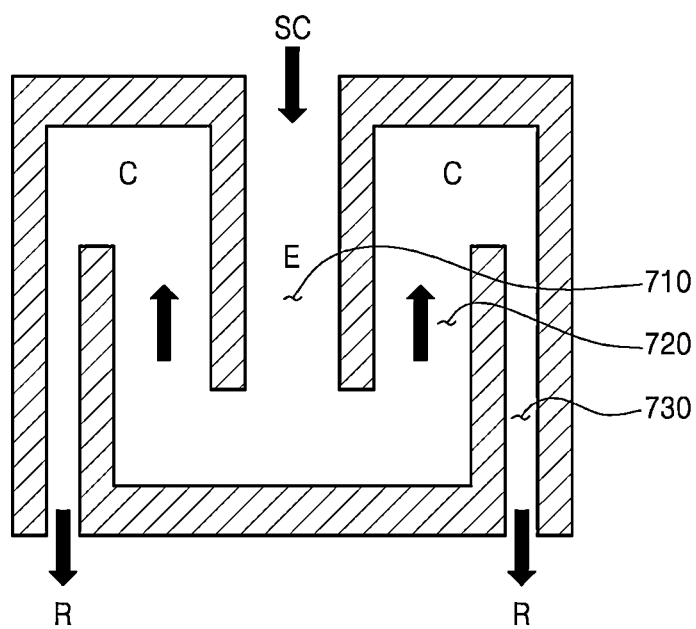

FIGS. 7A and 7B show embodiments of a top-down precursor supplier 700 of the present disclosure.

Referring to FIG. 7A, a channel of the precursor supplier 700 is configured to include at least one downward channel (e.g., downward channels 710 and 730) through which a fluid flows downward, and at least one upward channel (e.g., an upward channel 720) through which the fluid flows upward. The downward channels 710 and 730 and the upward channel 720 are provided adjacent to each other in parallel.

Specifically, the downward channel 710, the upward channel 720, and the downward channel 730 are sequentially provided adjacent to each other in a direction from both sides to a central axis of the precursor supplier 700. The downward channel 710 and the upward channel 720 are symmetric with respect to the central axis, and the downward channel 730 is provided at the center of the precursor supplier 700 and extends along the central axis.

The channel in the precursor supplier 700 is configured in such a manner that the fluid passes sequentially through the vaporization part E and the partial precipitation part C and then is discharged to the reaction part R. The flow of the fluid is indicated by arrows in FIG. 7A.

The vaporization part E provides a region where a condensed-phase precursor injected into the downward channel 710 is vaporized, and includes the downward channel 710 heated by a heat source. The partial precipitation part C is provided between the upward channel 720 extending from the downward channel 710 including the vaporization part E, and the downward channel 730 extending to the reaction part R. A temperature of the partial precipitation part C is maintained lower than the temperature of the vaporization part E. As described above, such temperature control may be implemented by controlling a temperature of the heater 640 provided on an outer circumferential surface of the reaction chamber 610 in which the precursor supplier 700 is provided.

The vaporization part E is maintained at a temperature equal to or higher than a vaporization temperature of the precursor. When injected into the vaporization part E, a condensed-phase precursor SC carried by a carrier gas, e.g., precursor powder, is vaporized into a gas-phase precursor. In this case, the condensed-phase precursor SC needs to be injected at a sufficient amount in such a manner that a vapor pressure of the vaporized precursor is higher than a saturated vapor pressure in the partial precipitation part C. This is a process condition for satisfying Condition 1 described above.

The gas-phase precursor flows upward along the upward channel 720 at the sides and reaches the partial precipitation part C maintained at a temperature lower than that of the vaporization part E. In this case, the gas-phase precursor having reached the partial precipitation part C is partially precipitated to a condensed phase. The precipitated condensed-phase precursor falls along the upward channel 720 due to a self-weight. For example, when the condensed phase is a solid phase, the precipitated solid-phase precursor may fall downward along the upward channel 720 in the form of particles due to the self-weight and be accumulated on the bottom. The accumulated particles may be removed by a user after the process is completed.

The gas-phase precursor having passed through the partial precipitation part C is discharged along the downward channel 730 to the reaction part R and reacts with a reaction gas to obtain inorganic powder. Because the gas-phase precursor partially precipitated through the partial precipitation part C is injected into the reaction part R, the gas-phase precursor may always be constantly supplied.

The operational principle of FIG. 7B is the same as that of FIG. 7A except that the downward channel 710 including the vaporization part E is positioned at the center of the precursor supplier 700 and that the downward channel 710, the upward channel 720, and the downward channel 730 are sequentially provided adjacent to each other in a direction from the center to both sides of the precursor supplier 700, and thus a repeated description therebetween is not provided herein.

Figure 8A:
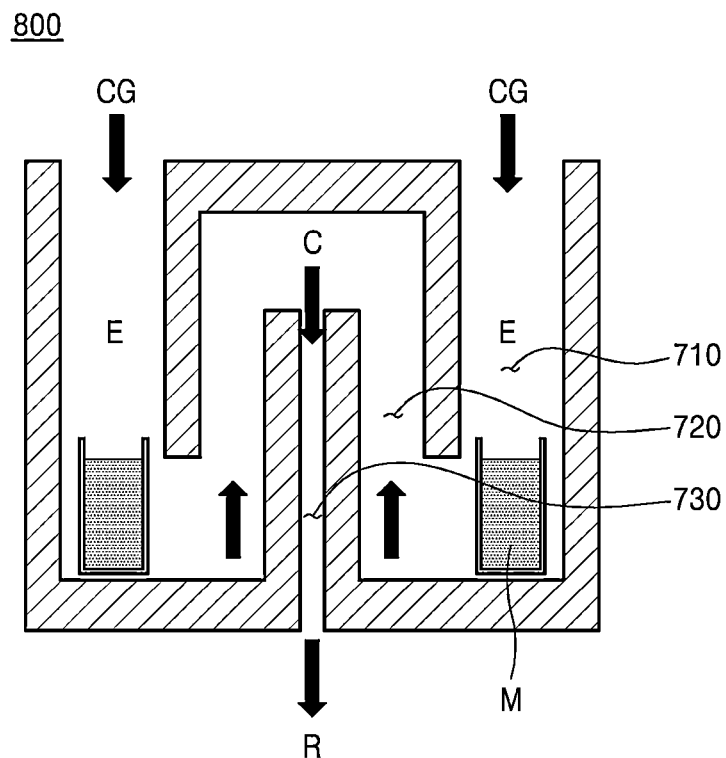
Figure 8B:
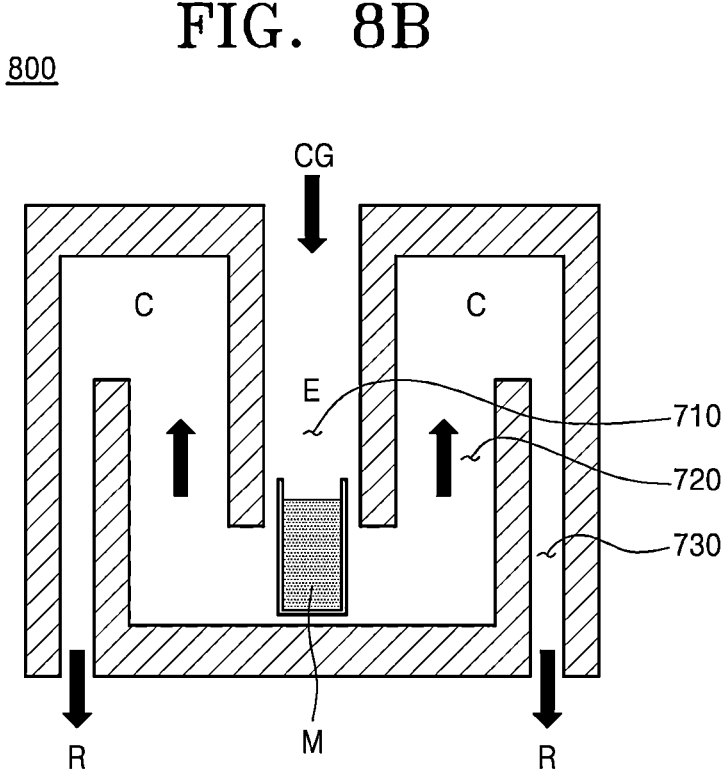

FIGS. 8A and 8B show other embodiments of a top-down precursor supplier 800 of the present disclosure.

Referring to FIG. 8A, the vaporization part E includes the precursor vaporizer M provided in a region through which a fluid moving downward along the downward channel 710 heated by a heat source passes. The carrier gas CG is injected into the downward channel 710, and a gas-phase precursor vaporized from the precursor vaporizer M is mixed with the carrier gas CG and reaches the partial precipitation part C through the upward channel 720. A description of a subsequent process has been already provided in relation to the previous embodiment, and thus is not provided herein.

The precursor vaporizer M may have a form of a furnace loaded with a powder- or pellet-type precursor or a liquid-phase precursor. The precursor vaporizer M may be refilled in real time by using a separate device. Alternatively, when a preset amount of the precursor is consumed after a certain time, the precursor vaporizer M may be replaced or be re-used by refilling the precursor.

According to an embodiment of the present disclosure, the gas-phase precursor participating in reaction may be maintained at a constant vapor pressure through the partial precipitation part C and thus, even when a solid-phase precursor loaded in the precursor vaporizer M exhibits a difference in particle shape or size, an irregular change in amount of the gas-phase precursor supplied to the reaction part R due to the difference may be suppressed as much as possible.

The operational principle of the precursor supplier 800 of FIG. 8B is the same as that of FIG. 8A except that the precursor vaporizer M is included in the downward channel 710 provided at the center, and thus a repeated description therebetween is not provided herein.

Figure 9A:
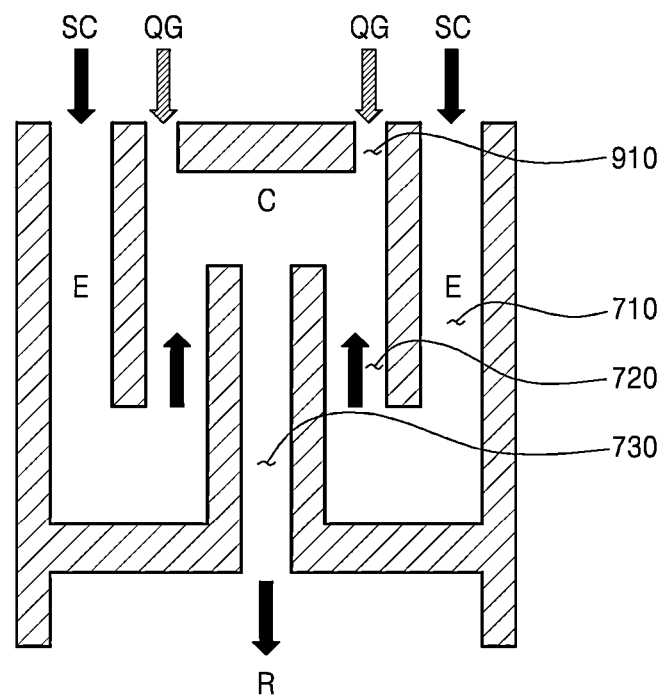
Figure 9B:
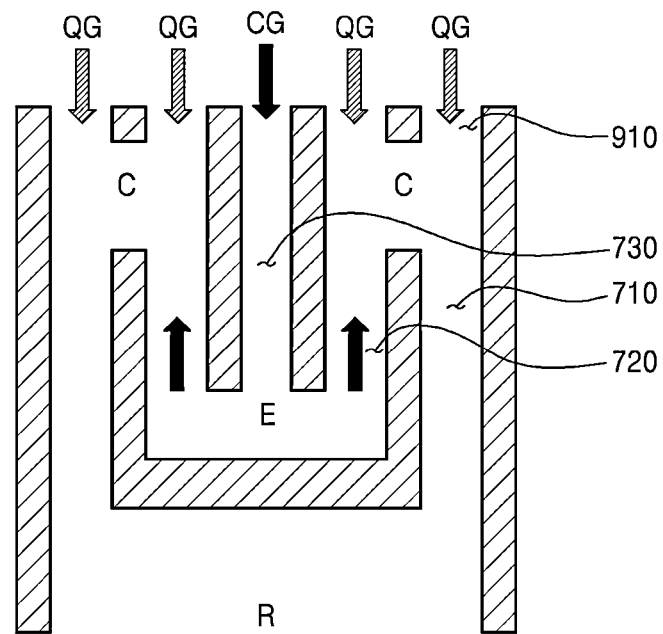
Figure 9C:
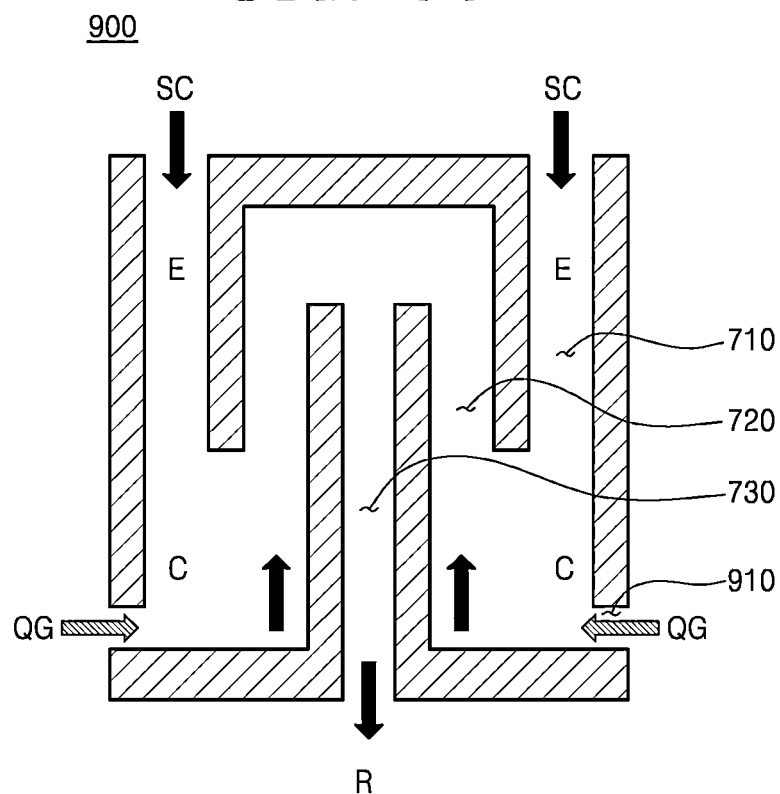

FIGS. 9A to 9C show other embodiments of a top-down precursor supplier 900 of the present disclosure. The precursor supplier 900 according to the current embodiments includes a quenching gas inlet 910 for injecting a quenching gas QG into the partial precipitation part C. The quenching gas QG cools the partial precipitation part C to reduce a temperature of the partial precipitation part C and an equilibrium vapor pressure of a precursor in the partial precipitation part C, thereby facilitating partial precipitation. The quenching gas QG may use an inert gas, a nitrogen gas, or the like.

Referring to FIGS. 9A and 9B, the quenching gas QG is provided to the partial precipitation part C through the quenching gas inlet 910 positioned at the top of the partial precipitation part C. Referring to FIG. 9C, the quenching gas QG is provided to the partial precipitation part C through the quenching gas inlet 910 positioned at sides of the partial precipitation part C. The injected quenching gas QG moves to the reaction part R together with other gases.

Figure 10A:
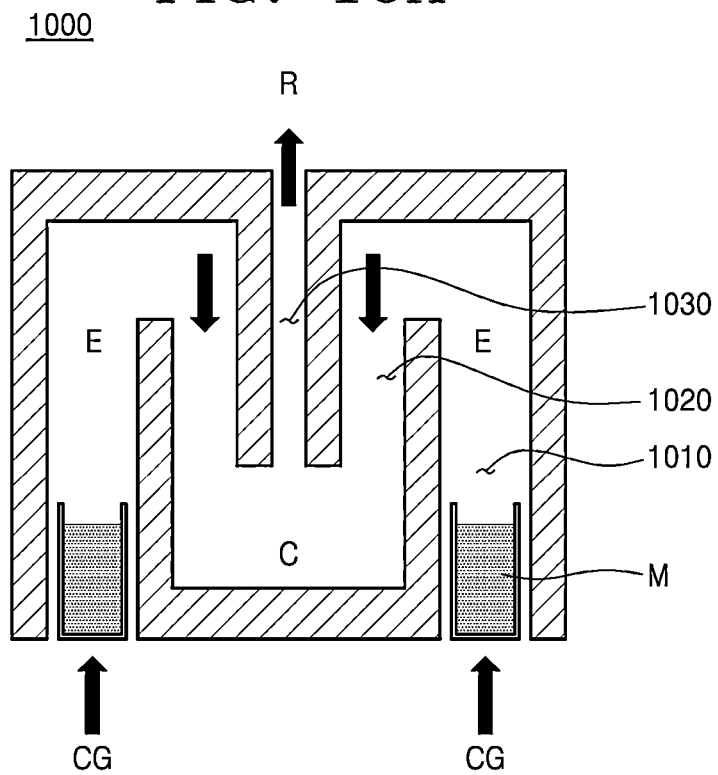
FIGS. 10A to 11C show embodiments of a bottom-up precursor supplier of the present disclosure.
Figure 10B:
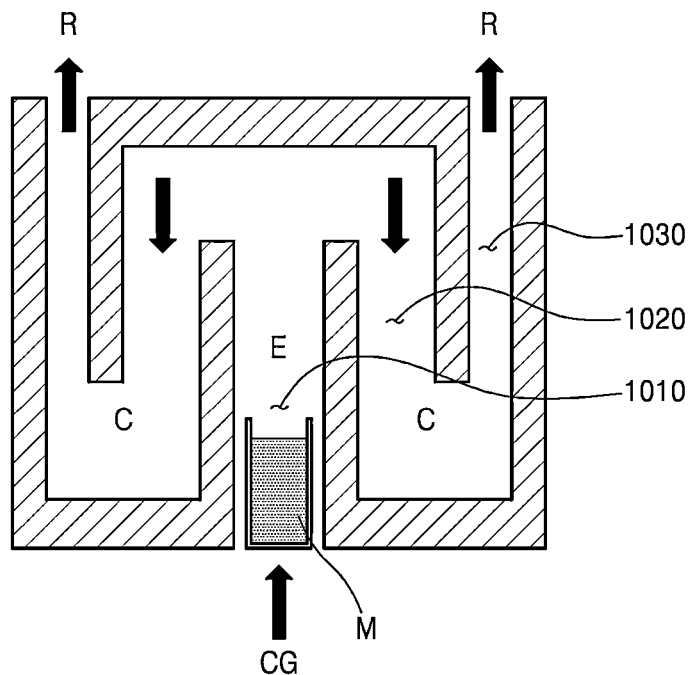

FIGS. 10A and 10B show embodiments of a bottom-up precursor supplier 1000 of the present disclosure.

Referring to FIG. 10A, a channel of the bottom-up precursor supplier 1000 is configured to include at least one upward channel (e.g., upward channels 1010 and 1030) through which a fluid flows upward, and at least one downward channel (e.g., a downward channel 1020) through which the fluid flows downward. The upward channels 1010 and 1030 and the downward channel 1020 are provided adjacent to each other in parallel.

Specifically, the upward channel 1010, the downward channel 1020, and the upward channel 1030 are sequentially provided adjacent to each other in a direction from both sides to a central axis of the precursor supplier 1000. The upward channel 1010 and the downward channel 1020 are symmetric with respect to the central axis, and the upward channel 1030 is provided at the center of the precursor supplier 1000 and extends along the central axis.

The channel in the precursor supplier 1000 is configured in such a manner that the fluid passes sequentially through the vaporization part E and the partial precipitation part C and then is discharged to the reaction part R. The flow of the fluid is indicated by arrows in FIG. 10A.

The vaporization part E includes the precursor vaporizer M provided in a region through which a fluid moving upward along the upward channel 1010 heated by a heat source passes. The partial precipitation part C is provided between the downward channel 1020 extending from the upward channel 1010 including the vaporization part E, and the upward channel 1030 extending to the reaction part R. A temperature of the partial precipitation part C is maintained lower than the temperature of the vaporization part E. The carrier gas CG is injected into the upward channel 1010, and a gas-phase precursor vaporized from the precursor vaporizer M is mixed with the carrier gas CG, rises along the upward channel 1010, and then falls through the downward channel 1020 to reach the partial precipitation part C. The gas-phase precursor partially precipitated in the partial precipitation part C flows upward along the upward channel 1030 and is discharged to the reaction part R. The condensed-phase precursor precipitated in the partial precipitation part C falls due to a self-weight and is accumulated on the bottom of the partial precipitation part C. The accumulated condensed-phase precursor may be removed later by a user after the process is completed.

The operational principle of FIG. 10B is the same as that of FIG. 10A except that the upward channel 1010 including the vaporization part E is positioned at the center of the precursor supplier 1000 and that the upward channel 1010, the downward channel 1020, and the upward channel 1030 are sequentially provided adjacent to each other in a direction from the center to both sides of the precursor supplier 1000, and thus a repeated description therebetween is not provided herein.

Figure 11A:
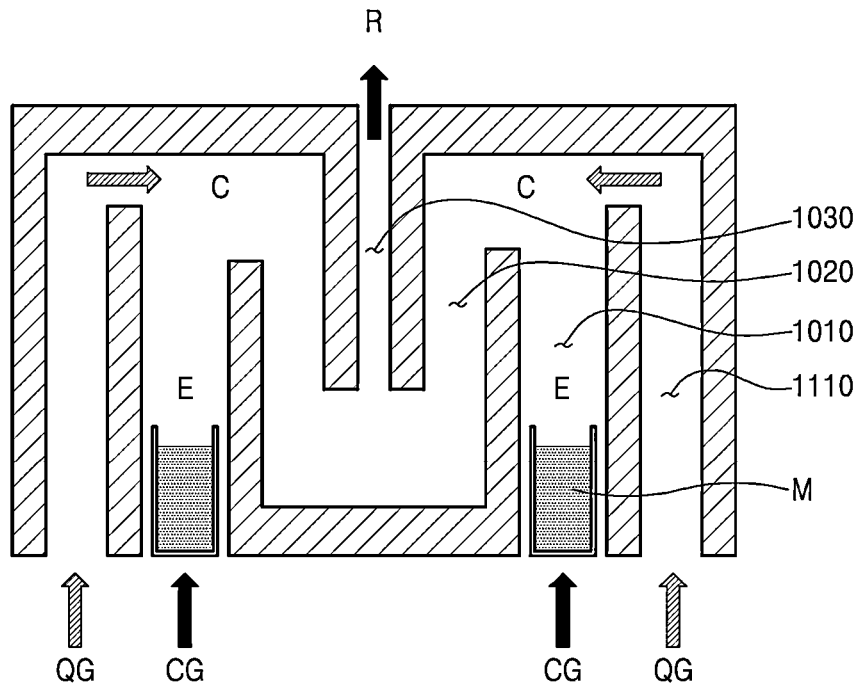
Figure 11B:
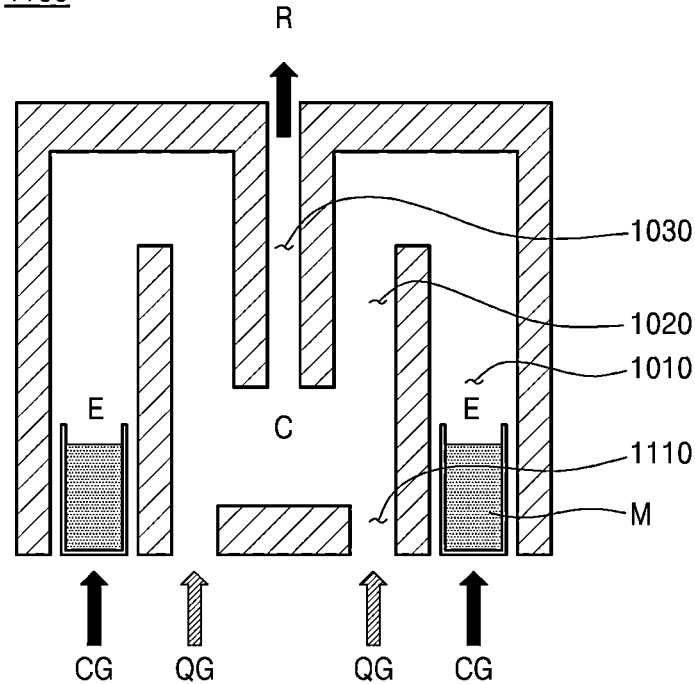
Figure 11C:
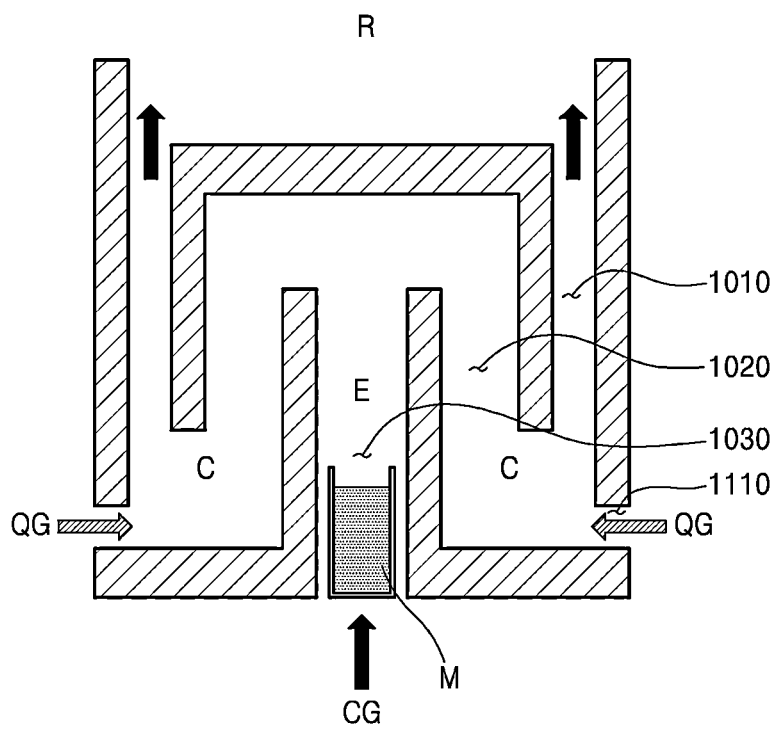

FIGS. 11A to 11C show other embodiments of a bottom-up precursor supplier 1100 of the present disclosure. The precursor supplier 1100 according to the current embodiments includes a quenching gas inlet 1110 for injecting a quenching gas QG into the partial precipitation part C.

Referring to FIGS. 11A and 11B, the quenching gas QG is provided to the partial precipitation part C through the quenching gas inlet 1110 positioned at the bottom of the partial precipitation part C. Referring to FIG. 11C, the quenching gas QG is provided to the partial precipitation part C through the quenching gas inlet 1110 positioned at sides of the partial precipitation part C.

Figure 12A:
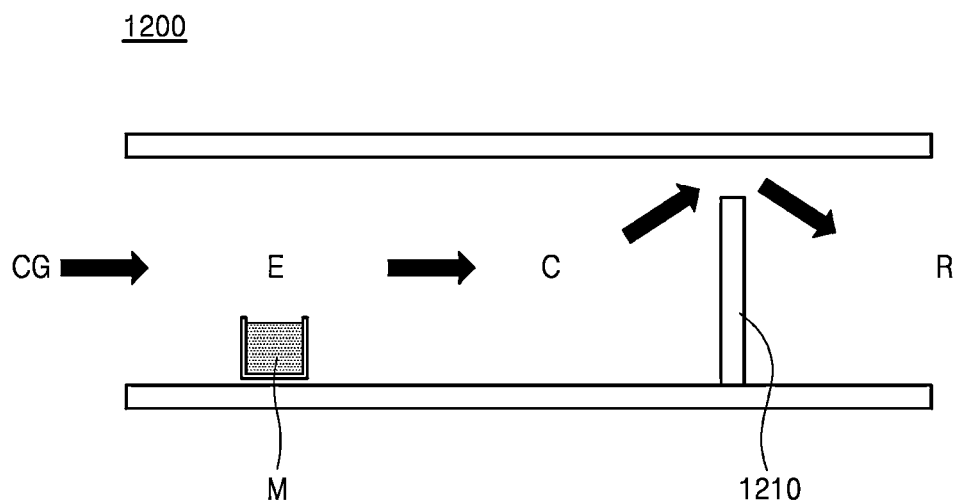
FIGS. 12A to 12C show embodiments of a horizontal precursor supplier according to an embodiment of the present disclosure.
Figure 12B:
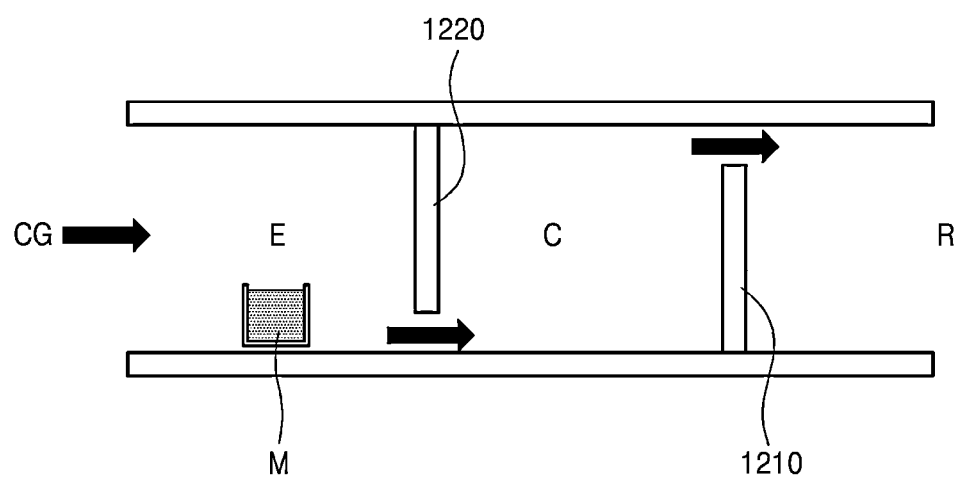
Figure 12C:
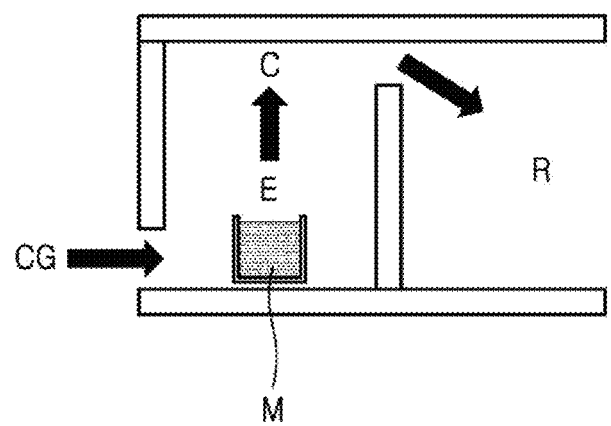

FIGS. 12A to 12C show embodiments of a horizontal precursor supplier 1200 of the present disclosure. Referring to FIG. 12A, the precursor supplier 1200 may include a fluid rise induction member 1210 for inducing a gas-phase precursor to move upward when the gas-phase precursor is discharged from the partial precipitation part C to the reaction part R. A condensed-phase precursor, e.g., a powder- or droplet-type precursor, which is partially precipitated when the gas-phase precursor rises from the partial precipitation part C due to the fluid rise induction member 1210 and is discharged to the reaction part R, falls downward due to a self-weight and is accumulated on the bottom of the partial precipitation part C. Therefore, injection of the condensed-phase precursor into the reaction part R may be prevented as much as possible.

In the embodiment illustrated in FIG. 12A, the fluid rise induction member 1210 having a form of a barrier with a top opening is provided between the partial precipitation part C and the reaction part R. In the embodiment illustrated in FIG. 12B, a barrier with a bottom opening is further provided between the vaporization part E and the partial precipitation part C to serve as a fluid fall induction member 1220 for inducing the gas-phase precursor to be provided to the partial precipitation part C from below. FIG. 12C shows a modified embodiment of the horizontal precursor supplier 1200 and, in the current embodiment, the partial precipitation part C is provided directly above the vaporization part E, and the gas-phase precursor rising from the vaporization part E and passing through the partial precipitation part C is injected into the reaction part R through the top opening of the fluid rise induction member 1210.

TEST EXAMPLES

Test examples of the present disclosure will now be described. However, the following test examples are merely for better understanding of embodiments of the present disclosure, and embodiments of the present disclosure are not limited thereto.

Properties of inorganic powder depending on presence of a partial precipitation part were observed. To this end, a vertical top-down chemical vapor synthesis apparatus as shown in FIG. 6 was used. Inventive Example 1 used a planar precursor supplier as shown in FIG. 9B. Comparative Examples 1 and 2 used the same apparatus as Inventive Example 1 except that a precursor was directly supplied into a reaction part instead of using the precursor supplier of the apparatus of FIG. 6. Temperatures of heaters 1 to 3 included in the heater 640 are shown in Table 2. In this test, Ni powder was produced and $NiCl_2$ was used as the precursor. A nitrogen gas ($N_2$) and a hydrogen gas ($H_2$) were used as a carrier gas and a reaction gas, respectively. Table 2 shows Ni powder synthesis conditions according to the inventive example and the comparative examples.

Figure 14:
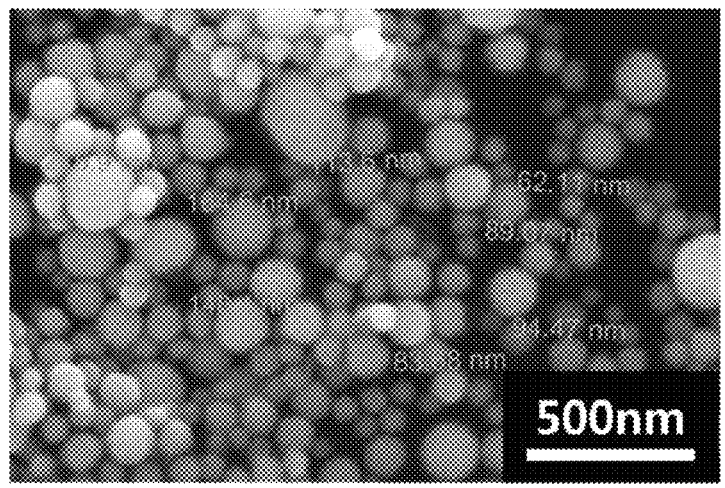

On the other hand, referring to FIG. 14, the Ni powder according to Comparative Example 1 has a GSD of 1.34 and a CMD of 101.51 nm and exhibits a wide particle size distribution and a mixture of large-sized particles and small-sized particles. It is understood that this result is because the precursor was not constantly supplied to the reaction part.

Figure 15:
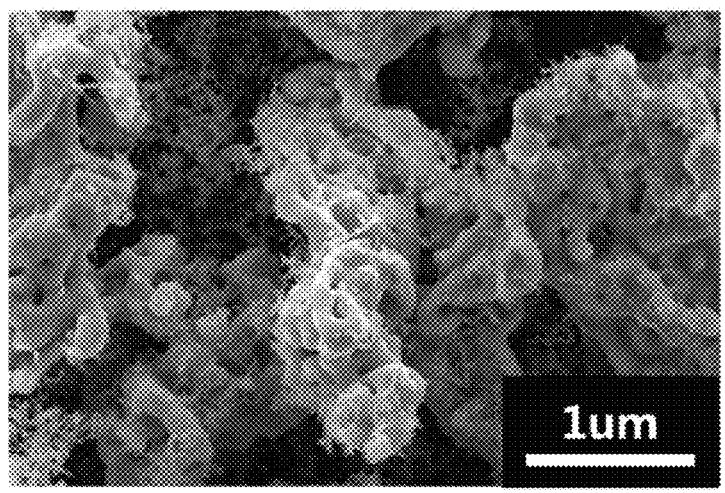

Meanwhile, referring to FIG. 15, the Ni powder according to Comparative Example 2 exhibits a shape inappropriate for measuring the GSD and CMD values. $NiCl_2$ serving as the precursor was not completely volatilized and thus Ni powder reduced by $H_2$ from solid-phase $NiCl_2$ was observed. Compared to Inventive Example 1, it is understood that the result of Comparative Example 2 is because a time sufficient to completely vaporize the solid-phase precursor was not ensured due to absence of the precursor supplier.

In an embodiment, a method for producing inorganic powder includes: forming a gas-phase precursor, by vaporizing a condensed-phase precursor in a vaporization part, partially precipitating the gas-phase precursor to a condensed phase in a partial precipitation part, and forming the inorganic powder, by having the gas-phase precursor remaining after being partially precipitated to the condensed phase react with a reaction gas in a reaction part. A vapor pressure of the gas-phase precursor formed in the vaporization unit is higher than an equilibrium vapor pressure of the precursor in the partial precipitation part, such that the gas-phase precursor is partially precipitated in the partial precipitation part. After the gas-phase precursor is partially precipitated in the partial precipitation part, a vapor pressure of the remaining gas-phase precursor is equal to or less than the equilibrium vapor pressure of the precursor in the reaction part.

TABLE 2

| Sample | Precursor Injection Rate | $N_2$ Flow Rate | $H_2$ Flow Rate | Precursor Supplier | Heater 1 Temp. | Heater 2 Temp. | Heater 3 Temp. |
| --- | --- | --- | --- | --- | --- | --- | --- |
| Inventive Example 1 | 250 g/hr | 12 LPM | 4 LPM | ○ | 1050° C. | 1025° C. | 1000° C. |
| Comparative Example 1 | 15 g/hr | 12 LPM | 4 LPM | X | 1050° C. | 1025° C. | 1000° C. |
| Comparative Example 2 | 250 g/hr | 12 LPM | 4 LPM | X | 1050° C. | 1025° C. | 1000° C. |

Table 3 shows particle size distributions and average particle sizes of Ni powder according to the inventive example and the comparative examples. The particle size distributions and the average particle sizes were calculated using geometric standard deviation (GSD) and count median diameter (CMD) values, respectively.

TABLE 3

| Sample | GSD | CMD |
| --- | --- | --- |
| Inventive Example 1 | 1.19 | 112.99 nm |
| Comparative Example 1 | 1.34 | 101.51 nm |
| Comparative Example 2 | N/A | N/A |

Figure 13:
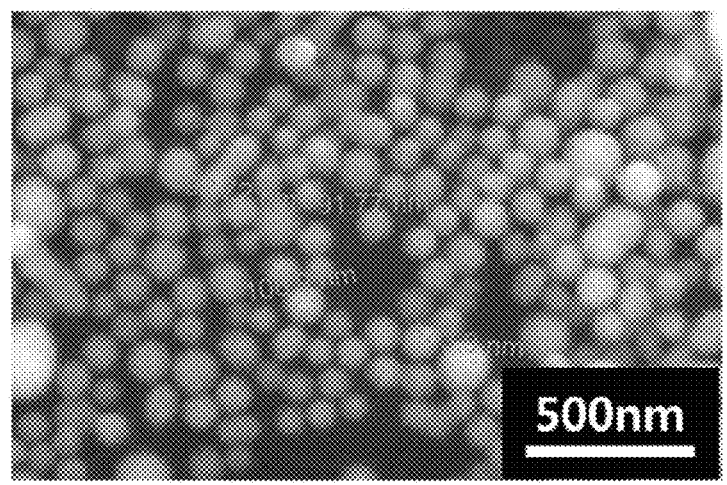
FIGS. 13 to 15 are scanning electron microscope (SEM) images of nickel (Ni) powder produced according to an inventive example and comparative examples.

FIG. 13 is a scanning electron microscope (SEM) image of Ni powder according to Inventive Example 1. FIGS. 14 and 15 are SEM images of Ni powder according to Comparative Examples 1 and 2, respectively.

Referring to FIG. 13, the Ni powder according to Inventive Example 1 has a GSD of 1.19 and a CMD of 112.99 nm and exhibits a narrow particle size distribution and very uniform-sized spherical particles.

According to an embodiment of the present disclosure, inorganic powder having a uniform particle shape and a narrow particle size distribution may be produced by quantitatively supplying a gas-phase precursor to a reaction part at a substantially constant amount. The above-described effect is merely an example, and the scope of embodiments of the present disclosure is not limited thereto.

While some embodiments of the present disclosure have been particularly shown and described above, it will be understood by one of ordinary skill in the art that various changes in form and details may be made therein without departing from the scope of the present invention as defined by the following claims.

What is claimed is:

1. An apparatus for producing inorganic powder, the apparatus comprising:
a vaporization part where a condensed-phase precursor is vaporized to obtain a gas-phase precursor;
a partial precipitation part where the gas-phase precursor obtained in the vaporization part is partially precipitated to a condensed phase; and a reaction part where the gas-phase precursor remaining after being partially precipitated to the condensed phase in the partial precipitation part reacts with a reaction gas to obtain the inorganic powder, wherein an equilibrium vapor pressure of the gas-phase precursor in the partial precipitation part is lower than a vapor pressure of the gas-phase precursor obtained in the vaporization part, and wherein an equilibrium vapor pressure of the precursor in the reaction part is equal to or higher than a vapor pressure of the gas-phase precursor partially precipitated to the condensed phase in the partial precipitation part.

2. The apparatus of claim 1, wherein a temperature of the vaporization part is higher than a temperature of the partial precipitation part, and wherein a temperature of the reaction part is equal to or higher than the temperature of the partial precipitation part.

3. The apparatus of claim 1, wherein the partial precipitation part comprises a precipitation induction member for inducing precipitation of the gas-phase precursor.

4. The apparatus of claim 1, wherein the apparatus comprises one of a bottom-up type in which the vaporization part, the partial precipitation part, and the reaction part are sequentially provided in a first direction opposite to a direction of gravity, a top-down type in which the vaporization part, the partial precipitation part, and the reaction part are sequentially provided in the direction of gravity, and a horizontal type in which the vaporization part, the partial precipitation part, and the reaction part are sequentially provided in a second direction perpendicular to the direction of gravity.

5. The apparatus of claim 1, wherein the inorganic powder comprises metal powder or ceramic powder.

6. The apparatus of claim 1, wherein the precursor comprises one or more of metal acetate, metal bromide, metal carbonate, metal chloride, metal fluoride, metal hydroxide, metal iodide, metal nitrate, metal oxide, metal phosphate, metal silicate, metal sulfate, and metal sulfide.

7. The apparatus of claim 1, wherein the inorganic powder comprises nickel (Ni), copper (Cu), silver (Ag), iron (Fe), aluminum (Al), cobalt (Co), platinum (Pt), gold (Au), tin (Sn), or an alloy thereof.

8. The apparatus of claim 1, wherein the inorganic powder comprises an oxide, nitride, or carbide of Ni, Cu, Ag, Fe, Al, Co, Pt, Au, or Sn.

9. An apparatus for producing inorganic powder, the apparatus comprising:

a precursor supplier comprising a channel; and a reaction part where a gas-phase precursor supplied from the precursor supplier reacts with a reaction gas to obtain the inorganic powder, wherein the precursor supplier comprises a vaporization part where a condensed-phase precursor is vaporized to obtain the gas-phase precursor, and a partial precipitation part where the gas-phase precursor obtained in the vaporization part is partially precipitated to a condensed phase, wherein the channel of the precursor supplier is configured in such a manner that a fluid passes sequentially through the vaporization part and the partial precipitation part and then is discharged to the reaction part, wherein the gas-phase precursor remaining after being partially precipitated to the condensed phase in the partial precipitation part is injected into the reaction part, wherein an equilibrium vapor pressure of the precursor in the partial precipitation part is lower than a vapor pressure of the gas-phase precursor obtained in the vaporization part, and wherein an equilibrium vapor pressure of the precursor in the reaction part is equal to or higher than a vapor pressure of the gas-phase precursor partially precipitated to the condensed phase in the partial precipitation part.

10. The apparatus of claim 9, wherein the channel is configured to comprise at least one downward channel through which the fluid flows downward, and at least one upward channel through which the fluid flows upward, and wherein the downward and upward channels are provided adjacent to each other in parallel.

11. The apparatus of claim 9, wherein a temperature of the vaporization part is maintained higher than a temperature of the partial precipitation part, and wherein a temperature of the reaction part is maintained equal to or higher than the temperature of the partial precipitation part.

12. The apparatus of claim 9, further comprising a quenching gas inlet for injecting a quenching gas into the partial precipitation part.

13. The apparatus of claim 9, wherein the channel of the precursor supplier includes a first downward channel, a second downward channel, and an upward channel, wherein the vaporization part is comprised in the first downward channel heated by a heat source, and wherein the partial precipitation part is provided between the upward channel extending from the first downward channel and the second downward channel extending to the reaction part.

14. An apparatus for producing inorganic powder, the apparatus comprising:

a precursor supplier comprising a channel; and a reaction part where a gas-phase precursor supplied from the precursor supplier reacts with a reaction gas to obtain the inorganic powder, wherein the precursor supplier comprises a vaporization part where a condensed-phase precursor is vaporized to obtain the gas-phase precursor, and a partial precipitation part where the gas-phase precursor obtained in the vaporization part is partially precipitated to a condensed phase, wherein the channel of the precursor supplier is configured in such a manner that a fluid passes sequentially through the vaporization part and the partial precipitation part and then is discharged to the reaction part, wherein the gas-phase precursor remaining after being partially precipitated to the condensed phase in the partial precipitation part is injected into the reaction part, wherein a temperature of the vaporization part is maintained higher than a temperature of the partial precipitation part, and wherein a temperature of the reaction part is maintained equal to or higher than the temperature of the partial precipitation part.

* * * * *